US008775669B2

(12) United States Patent
Hutchinson

(10) Patent No.: US 8,775,669 B2
(45) Date of Patent: Jul. 8, 2014

(54) DATA COMMUNICATION SYSTEMS AND METHODS

(75) Inventor: Mark Hutchinson, Louisville, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 1082 days.

(21) Appl. No.: 12/732,039

(22) Filed: Mar. 25, 2010

(65) Prior Publication Data

US 2011/0238861 A1    Sep. 29, 2011

(51) Int. Cl.
*G06F 15/173*    (2006.01)
(52) U.S. Cl.
USPC .......................................................... 709/238
(58) Field of Classification Search
CPC . H04L 12/5691; H04L 12/5692; H04L 69/16; H04W 88/06; H04W 40/02; H04W 40/04; H04W 40/06; H04W 40/12; H04W 40/18; H04W 48/18
USPC .......................................................... 709/238
See application file for complete search history.

(56) References Cited

U.S. PATENT DOCUMENTS

| | | | |
|---|---|---|---|
| 5,680,551 A | 10/1997 | Martino, II | |
| 6,801,777 B2 | 10/2004 | Rusch | |
| 6,940,813 B2 | 9/2005 | Ruutu | |
| 7,127,507 B1 | 10/2006 | Clark et al. | |
| 7,216,181 B1 | 5/2007 | Jannu et al. | |
| 7,599,323 B2 * | 10/2009 | Chandranmenon et al. | 370/328 |
| 8,271,657 B2 * | 9/2012 | Eastham | 709/227 |
| 2002/0078132 A1 | 6/2002 | Cullen et al. | |
| 2003/0065784 A1 * | 4/2003 | Herrod | 709/227 |
| 2004/0009751 A1 * | 1/2004 | Michaelis et al. | 455/62 |
| 2004/0264402 A9 * | 12/2004 | Whitmore et al. | 370/328 |
| 2005/0249122 A1 * | 11/2005 | Wheeler et al. | 370/241 |
| 2006/0015636 A1 * | 1/2006 | Skraba et al. | 709/232 |
| 2006/0233144 A1 * | 10/2006 | Matsumoto | 370/338 |
| 2008/0037554 A1 * | 2/2008 | Vincent et al. | 370/395.42 |
| 2008/0112354 A1 * | 5/2008 | Toutonghi | 370/328 |

* cited by examiner

*Primary Examiner* — Christopher Biagini
(74) *Attorney, Agent, or Firm* — Alston & Bird LLP

(57) ABSTRACT

Various embodiments of the present invention are directed to systems and methods for enabling software applications running on separate devices to exchange data via multiple data communication methods. In various embodiments, a data communication system is provided comprising multiple data communication devices running one or more software applications and communication manager middleware. In various embodiments, the data communication system permits the software applications to exchange data without knowledge of the actual method and/or protocol used to exchange a given set of data, and intelligently manage the exchange of data between software applications by, among other things, transmitting sets of data using a preferred communication method selected based on one or more message attributes or communication method attributes.

13 Claims, 5 Drawing Sheets

DATA COMMUNICATION SYSTEMS AND METHODS

BACKGROUND OF THE INVENTION

1. Field of the Invention

Embodiments of the present invention are generally directed to systems and methods for sending and receiving data in a system environment.

2. Background

There is often a need for software applications running on one or more separate machines to communicate and exchange data over one or more networks as part of a distributed computing system. For example, in a shipping carrier system, a software application running on a mobile device (e.g., a data gathering device on a shipping truck) may need to exchange telematics data with another software application running on a central server. As the availability of various communication methods (e.g., cellular networks, wireless local area networks) may vary depending on the location of the mobile device, the shipping carrier system is configured to permit the software applications to exchange data over a variety of networks.

In addition, as the cost of exchanging data varies depending on the communication network used, it may also be desirable to prioritize data being exchanged. For example, telematics data indicating an emergency on a shipping truck would be of high priority and preferably exchanged as quickly as possible with lesser regard to cost. However, telematics data used for general analysis at a later date would be of relatively low priority and preferably exchanged as cheaply as possible with lesser regard to timeliness.

There are, however, a number of technical problems associated with configuring a shipping carrier system to accomplish the preferences described above. For example, software applications are commonly coupled to specific communication methods. As such, it may also be difficult and time consuming to configure software applications to transmit data over a variety of communications methods. In addition, it can also be difficult to reconfigure existing software applications to implement new communication methods as they emerge (e.g., 4G cellular networks, high speed internet networks) and phase out older communication methods as they become obsolete.

Accordingly, there is a need in the art for a system that (i) enables software applications running on one or more separate machines to communicate and exchange data via a variety of communication methods, (ii) selects a preferred communication method for a given set of data based on the priority of the data, and/or (iii) facilitates the addition of new communication methods to the system, and the removal of obsolete communication methods from the system, with minimal change to software applications.

BRIEF SUMMARY OF THE INVENTION

Various embodiments of the present invention are directed to a device for sending and receiving data in a system environment. In various embodiments, the device comprises two or more data communication interfaces configured for transmitting and receiving data via two or more data communication methods; one or more processors configured to: transmit data outbound from the device via the data communication interfaces, receive data inbound to the device via the data communication interfaces, execute at least one client application, and execute a middleware communication manager module. In various embodiments, the middleware communication manager module is configured to: receive a first set of outbound data from the client application via an application program interface; select a preferred data communication method for transmitting the first set of outbound data, wherein the preferred data communication method is selected from the data communication methods based on one or more attributes of the first set of outbound data; and route the first set of outbound data to a preferred data communication interface, wherein the preferred data communication interface is associated with the preferred data communication method.

According to various other embodiments, the device comprises two or more data communication interfaces configured for transmitting and receiving data via three or more data communication methods; one or more processors configured to: transmit data outbound from the device via the data communication interfaces; receive data inbound to the device via the data communication interfaces; execute at least one client application; and execute a middleware communication manager module. In various embodiments, the middleware communication manager module is configured to: receive a first set of outbound data from the client application via an application program interface, wherein the first set of outbound data is associated with data indicating a level of priority; select at least two preferred data communication methods for transmitting the first set of outbound data, wherein the preferred data communication methods are selected from the data communication methods based at least in part on the level of priority associated with the first set of outbound data; arrange the preferred data communication methods hierarchically according to relative preference; identify available preferred data communication methods; and route the first set of outbound data to the most-preferred of the available preferred data communication methods according to the hierarchical arrangement of the preferred data communication methods.

Various other embodiments of the present invention are directed to a system for exchanging data among devices in a shipping carrier network. In various embodiments, the system comprises: a mobile device comprising: a plurality of data communication interfaces configured for transmitting and receiving data via two or more data communication methods; and one or more processors configured for: executing a first client application, executing a remote middleware communication manager module configured to manage outbound messages sent from the first client application and inbound messages bound for the first client application, wherein the remote middleware communication manager module is configured to: determine the priority of a first outbound message based at least in part on attributes associated with the first outbound message, wherein the first outbound message is received from the first client application; select one of the plurality of data communication interfaces of the mobile device to send the first outbound message; and queue the first outbound messages in an outbound message queue; and a central server comprising: a plurality of data communication interfaces configured for transmitting and receiving data to the mobile device via two or more data communication methods; and one or more processors configured for: executing a second client application; executing a central middleware communication manager module configured to manage outbound messages sent from the second client application and inbound messages bound for the second client application, wherein the central middleware communication manager module is configured to: determine the priority of a second outbound message based at least in part on attributes associated with the second outbound message, wherein the second outbound message is received from the second client application; select one of the plurality of data communication interfaces of the central server to send the second outbound message; and queue the second outbound messages in an outbound message queue.

Various other embodiments of the present invention are directed to a computer program product for sending and receiving data in a system environment. In various embodiments the computer program product comprises at least one computer-readable storage medium having computer-readable program code portions stored therein, the computer-readable program code portions comprising: an executable portion configured to receive outbound data from a client application via an application program interface, wherein the outbound data is associated with a priority identifier; an executable portion configured to select a preferred data communication method for transmitting the outbound data, wherein the preferred data communication method is selected from two or more data communication methods based, at least in part, on the priority identifier; an executable portion configured to route the outbound data to a preferred data communication interface, wherein the preferred data communication interface is associated with the preferred data communication method.

Various other embodiments of the present invention are directed to a computer-implemented method for sending and receiving data in a system environment, the method comprising the steps of: receiving outbound data from a client application via an application program interface, wherein the outbound data is associated with a priority identifier; selecting a preferred data communication method for transmitting the outbound data, wherein the preferred data communication method is selected from two or more data communication methods based, at least in part, on the priority identifier; and routing the outbound data to a preferred data communication interface, wherein the preferred data communication interface is associated with the preferred data communication method.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
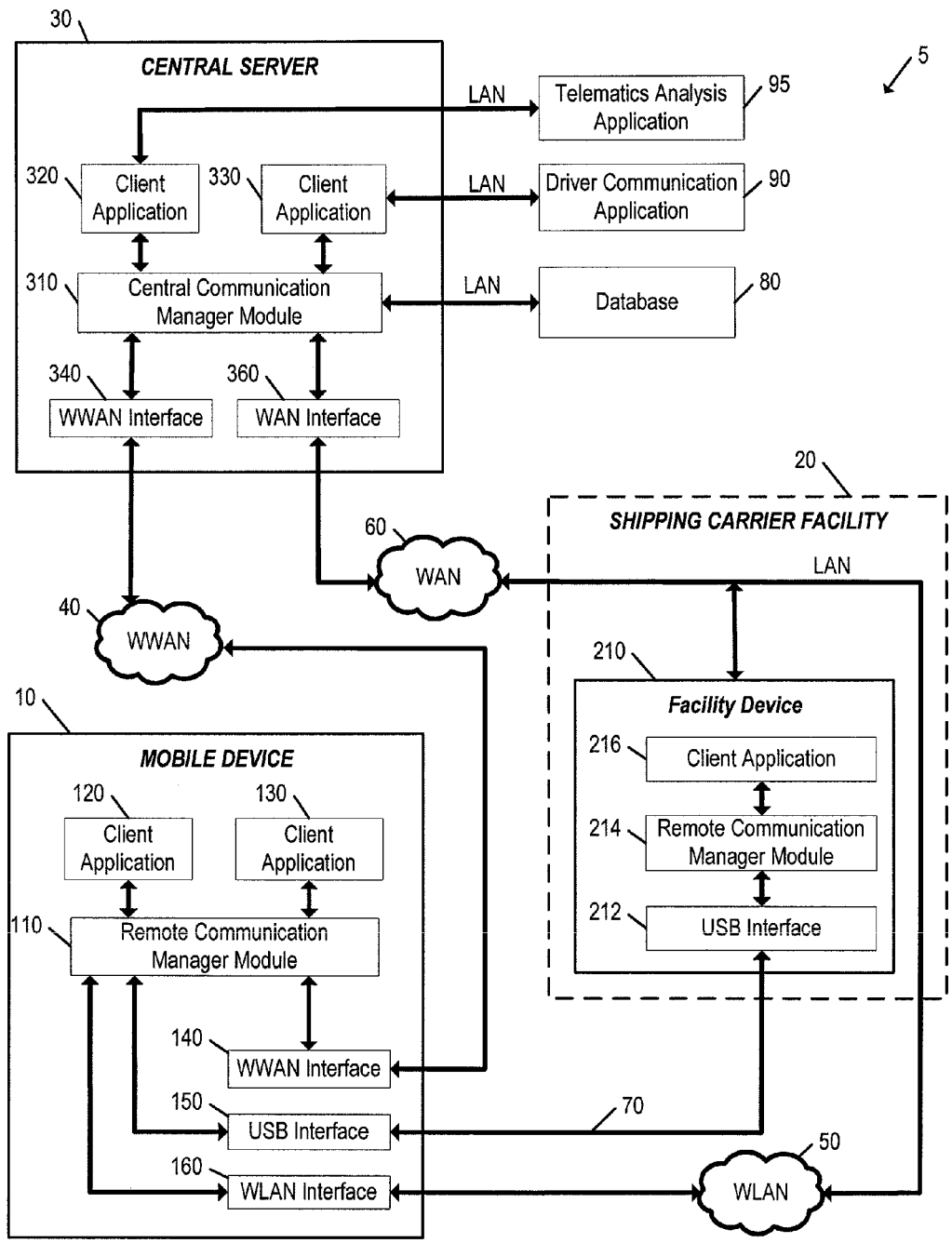
FIG. 1 is a schematic diagram of a data communication system according to one embodiment of the present invention.

Various embodiments of the present invention will now be described more fully with reference to the accompanying drawings, in which some, but not all embodiments of the invention are shown. Indeed, various embodiments of the invention may be embodied in many different forms and should not be construed as limited to the embodiments set forth herein. Like numbers refer to like elements throughout.

As will be appreciated by one skilled in the art, various embodiments of the present invention may be embodied as a method, a data processing system, or a computer program product. Accordingly, various embodiments of the present invention may take the form of an entirely hardware embodiment, an entirely software embodiment, or an embodiment combining software and hardware aspects. Furthermore, various embodiments of the present invention may take the form of a computer program product on a computer-readable storage medium having computer-readable program instructions (e.g., computer software) embodied in the storage medium. More particularly, various embodiments of the present invention may take the form of web-implemented computer software. Any suitable computer-readable storage medium may be utilized including hard disks, CD-ROMs, optical storage devices, or magnetic storage devices.

Various embodiments of the present invention are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations for performing the specified functions, combinations of steps for performing the specified functions, and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

Various embodiments of the present invention provide systems and methods for enabling software applications running on separate devices to exchange data via multiple data communication methods. In various embodiments, a data communication system is provided comprising multiple data communication devices (e.g., a server, a personal computer, and a mobile device). According to various embodiments, each of the data communication devices includes various communication hardware (e.g., 802.11 radio, USB interface, GPRS radio) and one or more processors configured for running an operating system (e.g., Windows, Windows Mobile, Windows Server), one or more software applications, and communication manager middleware (e.g., message oriented middleware).

In certain instances, the software applications running on the separate data communication devices may need to exchange data with one another via various communication methods (e.g., WWAN, WLAN, USB). Accordingly, components of the communication manager middleware running on each of the data communication devices facilitate interoperability among the software applications by providing an application program interface (API) through which the software applications on a given device may send and receive data. By decoupling the software applications from the data communication hardware and software on each data communication device, the communication manager middleware permits the software applications to exchange data without knowledge of the actual method and/or protocol used to exchange a given set of data. In addition, the communication manager middleware is configured to intelligently manage the exchange of data between software applications by, among other things, transmitting sets of data using a preferred communication method (e.g., WWAN, WLAN, USB) selected based on one or more message attributes (e.g., priority, type, status) or communication method attributes (e.g., cost, availability).

According to various embodiments, the communication manager middleware is a software package comprised of one or more communication manager modules running on various components of a data communication system. In various embodiments, the communication manager modules are software components of the communication manager middleware loaded onto data communication devices (herein "devices") that facilitate communication via a variety of data communication methods. Each communication manager module is configured to enable one or more software applications (herein "client applications") residing on the associated device to communicate with client applications residing on other devices via select data communication methods. As used herein, the term "client application" refers generally to any software application configured to interoperate with a particular communication manager module. For example, client applications of a particular communication manager module would be, generally, those software applications configured to send messages to, and receive messages from a communication manager module. In addition, as used herein, the term "message" refers generally to data that may be transmitted between software applications (e.g., instructions, data).

According to various embodiments, each communication manager module is configured to communicate with client applications via a single API. As a result, each communication manager module's client applications are isolated from the communication methods used to transmit inbound and outbound messages and, as described above, are able to send and receive messages without knowledge of the actual method and/or protocol used to exchange a given message. As a result, it is not necessary to configure client applications to exchange data using a particular data communication method or protocol. Rather, in various embodiments, the client applications may be configured to send messages to and receive messages from the API, and permit the communication manager module to manage and route messages through the communication hardware of the device on which the client applications reside. Thus, if a device's data communication hardware or software is altered (e.g., by adding new data communication hardware or removing obsolete data communication hardware), interoperability with the data communication hardware and/or software may be preserved by reconfiguring the communication manager module while the client applications remain unchanged.

In addition, according to various embodiments, the communication manager modules are further configured to intelligently manage and route messages inbound to and outbound from their respective client applications by storing and forwarding messages as necessary. For example, in various embodiments, the communication manager modules are configured to store received messages (e.g., messages outbound from a client application and/or messages inbound to a client application) and, thereafter, send those messages to their target destinations according to a predefined logic. In certain embodiments, the communication manager modules are configured to determine the order in which messages outbound from a client application are transmitted based, at least in part, on a priority assigned to each message (e.g., by a client application) and/or the order in which the messages are received from the client application. In further embodiments, the communication manager modules are also configured to select a preferred communication method for sending a given outbound message based, at least in part, on the priority assigned to the message. In addition, in various embodiments, the communication manager modules are configured to notify client applications when inbound messages are received, and store those inbound messages until their delivery is requested by a client application. By tailoring the logic of the communication manager modules to meet the needs of data communication system users, the communication manager modules are able to control costs associated with transmitting messages, while ensuring each message is transmitted in a timely manner.

System Architecture

To facilitate understanding, various features of the present invention will be described in the context of a shipping system. However, it should be understood that various embodiments of the present invention may be used in a variety of contexts where communication between devices over different communication methods is desired.

A data communication system 5 according to one embodiment is shown in FIG. 1. In the illustrated embodiment, the system 5 includes a mobile device 10, a shipping carrier facility 20, and a central server 30. These components are configured to communicate using one or more of a Wireless Wide Area Network (WWAN) 40, a Wireless Local Area Network (WLAN) 50, a Wide Area Network (WAN) 60, and a USB link 70. It should be understood that other embodiments may include components that communicate using one or any combination of known or developed communication methods, some of which are listed above.

In one embodiment, the mobile device 10 is positioned within a shipping vehicle and a facility device 210 is positioned in the shipping carrier facility 20, which may be a shipping hub where packages are loaded and unloaded from shipping vehicles. In various embodiments, the device positioned in the shipping carrier facility may be a mobile or stationary computing device. The central server 30 may be located in a central control facility remote from the shipping carrier facility 20. In other embodiments, the central server may be positioned in a shipping carrier facility.

As will be described in more detail below, the data communication system 5 provides a communication infrastructure in which software applications residing on the mobile device 10 are able to exchange data (e.g., shipping instructions, telematics data) with software applications residing on the central server 30 (e.g., via the WWAN 40) and software applications residing on devices in the shipping carrier facility 20 (e.g., via the WLAN 50 and USB link 70). In various other embodiments, the data communication system 5 may further include additional mobile devices located on a fleet of shipping vehicles, additional shipping carrier facilities, and additional servers linked by a combination the various networks 40, 50, 60 as part of a comprehensive communication infrastructure for a large shipping carrier.

According to one embodiment, the mobile device 10 is an in-vehicle mobile computer (e.g., a Motorola VC6096) having one or more display screens, one or more user input devices (e.g., a keyboard, a keypad, a touch display, barcode reader, radio frequency identification (RFID) tag reader), and wireless voice and data capabilities that may include WWAN, WLAN, Bluetooth, GPS, and telematics support. As shown in FIG. 1, the mobile device 10 includes a WWAN interface 140 (e.g., GPRS radio, CDMA radio), a USB interface 150 (e.g., USB 2.0 connection port), and a WLAN interface 160 (e.g., IEEE 802.11 radio), through which the mobile device 10 sends and receives data. The mobile device 10 further includes one or more processors configured for running a remote communication manager module 110 and one or more client applications 120, 130. In further embodiments, the mobile device 10 may be any type of mobile computing device such as a personal data assistant, cellular telephone or laptop computer.

In one embodiment, the remote communication manager module 110 is a software component of the communication manager middleware configured for managing and routing outbound data received from the client applications 120, 130 and inbound data received via the interfaces 140, 150, 160 (e.g., from software applications residing on other devices). In addition, according to one embodiment, the client applications 120, 130 are software applications configured to utilize inbound data received from the remote communication manager module 110 and/or generate outbound data sent to the remote communication manager module 110. For example, in one embodiment, the client application 120 is configured for sending, receiving, and providing visibility to shipping data (e.g., displaying delivery instructions to a driver received from a shipping carrier workstation; receiving updates on delivery status from a driver's user input and sending the updates to a shipping carrier workstation). In addition, according to one embodiment, the client application 130 is configured for collecting and sending telematics data received from one or more vehicle sensors (e.g., engine rpm data captured from an engine sensor), as well as receiving instructions for collecting such telematics data from an external source (e.g., a shipping carrier workstation).

In the illustrated embodiment of FIG. 1, the shipping carrier facility 20 includes a facility device 210 linked to a Local Area Network (LAN) within the shipping carrier facility. As shown, the facility device 210 is configured to communicate with the mobile device 10 over the WLAN 50 and USB interface 70, and with the central server 30 over the WAN 60. In certain embodiments, facility device may also be configured to communicate with the mobile device 10 over WWAN 40 or WLAN 50. Additionally, the shipping carrier facility may also include one or more software applications running on various workstations connected to the LAN.

In various embodiments, the facility device 210 is a computer having one or more display screens, one or more user input devices (e.g., a keyboard, a keypad, a touch display), and various data communication capabilities. For example, in one embodiment, the facility device 210 is the same type of device as the mobile device 10 and is positioned at a user work area within the shipping carrier facility 20. In the illustrated embodiment of FIG. 1, the facility device 210 includes a USB interface 212 (e.g., a USB 2.0 connection port), which enables the facility device 210 to exchange data with the mobile device 10 (e.g., via the USB interface 150) or other devices using a USB compatible cable or remote storage device. In the illustrated embodiments, the facility device 210 further includes one or more processors configured for running a remote communication manager module 214 and a client application 216. As will be described in more detail below, the remote communication manager module 214 is another software component of the communication manager middleware, and is configured for managing and routing data inbound to and outbound from the facility device 210. In addition, according to one embodiment, the remote communication manager module 214 comprises the same software as the remote communication manager module 110. In one embodiment, the client application 216 is configured for storing and managing driver data (e.g., driver time card data, or other administrative data).

In the illustrated embodiment, the central server 30 includes one or more processors configured for running a central communication manager module 310 and client applications 320, 330. In addition, the central server 30 includes a WWAN interface 340 and a WAN interface 360, through which the central server 30 may send and receive data. For example, in the illustrated embodiment, the central server 30 is configured for exchanging data with the mobile device 10 over the WWAN 40 and exchanging data with the facility device 210 over WAN 60. In addition, the central server 30 is further configured for exchanging data with the mobile device 10 over the WAN 60, via the LAN of the shipping carrier facility 20 and WLAN 50. In other embodiments, the central server 30 may include other methods or combinations of methods for communicating with other devices in the system.

As will be described in more detail below, the central communication manager module 310 is another software component of the communication manager middleware configured for managing and routing outbound data received from the client applications 320, 330 and inbound data received via the WWAN interface 340 and WAN interface 60. In addition, as shown in the illustrated embodiment, the central communication manager module 310 is linked over a LAN to a database 80, on which the central communication manager module 310 may store data. According to various other embodiments, additional instances of the central communication manager module 310 may be provided on a local area network connected to the WAN 60 to provide a distributed version of the central communication manager module 310.

According to various embodiments, the client applications 320, 330 are software applications configured to utilize inbound data received from the communication manager module 310 and generate outbound data sent to the communication manager module 310. For example, in the illustrated embodiment of FIG. 1, the client application 320 is linked over a LAN to a telematics analysis application 95. In one embodiment, the telematics analysis application 95 is a software application running on a shipping carrier workstation (not shown) configured for analyzing telematics data recorded by the client applications 120, 130 on the mobile device 10. Accordingly, in such an embodiment, the client application 320 is configured to receive inbound data collected by the client applications 120, 130 and format the inbound data such that it may be analyzed by the telematics analysis application 95. In addition, the client application 320 may be further configured to format outbound data (e.g., telematics recording instructions) received from the telematics analysis application 95 such that the outbound data may be effectively processed by the mobile device 10. In further embodiments, the client application 320 performs the telematics analysis itself. Similarly, in one embodiment, the client application 330 is configured to format inbound and outbound data being exchanged with a driver communication application 90 (e.g., over the illustrated LAN), which is configured for sending and receiving routing and delivery instructions to the driver of the vehicle on which the mobile device 10 is located. In further embodiments, the client application 330 performs the functions of the driver communication application 90.

Figure 2:
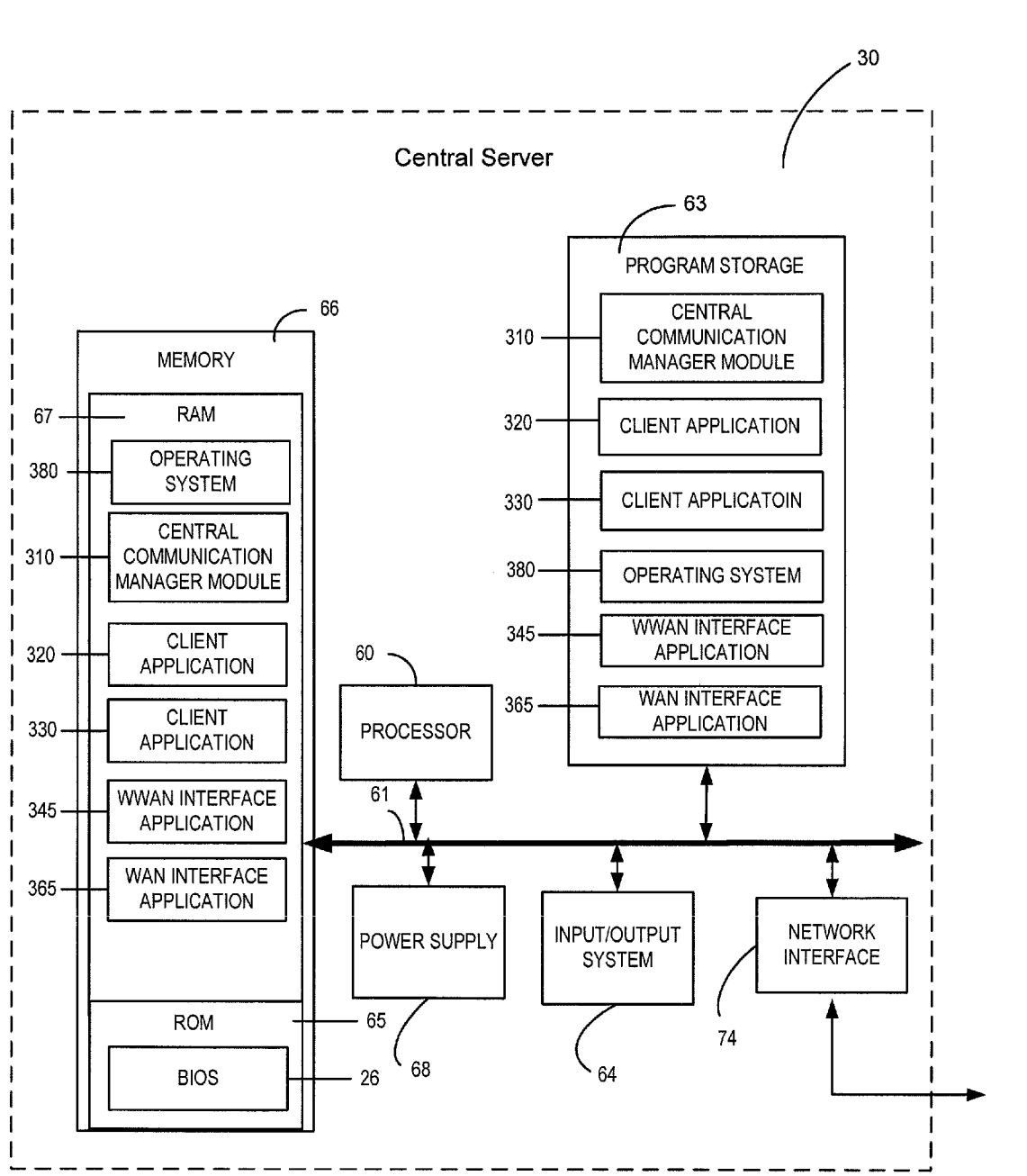
FIG. 2 is a schematic diagram of a central server according to one embodiment of the present invention.

FIG. 2 is a more detailed schematic diagram of the central server 30 according to one embodiment. In the illustrated embodiment, the central server 30 includes a processor 60 that communicates with other elements within the central server 30 via a system interface or bus 61. Also included in the central server 30 is a display device/input device 64 for receiving and displaying data. This display device/input device 64 may be, for example, a keyboard or pointing device that is used in combination with a monitor or display. The central server 30 further includes memory 66, which preferably includes both read only memory (ROM) 65 and random access memory (RAM) 67. The server's ROM 65 is used to store a basic input/output system 26 (BIOS), containing the basic routines that help to transfer information between elements within the central server 30.

In addition, the central server 30 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a server. It is important to note that the computer-readable media described above could be replaced by any other type of computer-readable media known in the art. Such media include, for example, magnetic cassettes, flash memory cards, digital video disks, and Bernoulli cartridges.

A number of program modules, such as those described above, may be stored by the various storage devices and within RAM 67. Such program modules include an operating system 380 (e.g., Windows Server), the central communication manager module 310, the client applications 320, 330, a WWAN interface application 345 (e.g., software configured for controlling aspects of the WWAN interface 340), and a WAN interface application 365 (e.g., software configured for controlling aspects of the WAN interface 360). According to various embodiments, the central communication manager module 310, client applications 320, 330, and interface applications 345, 365 control certain aspects of the operation of the central server 30 with the assistance of the processor 60 and operating system 380. Various embodiments of these modules and applications are described in more detail below.

In a particular embodiment, the program modules and applications 310, 320, 330, 345, and 365 are executed by the central server 30 and are configured to generate graphical user interfaces. In other embodiments, one or more of the modules 310, 320, 330, 345, and 365 may be stored locally on various computers and executed by one or more processors of the various computers. According to various embodiments, the modules 310, 320, 330, 345, and 365 may send data to, receive data from, and utilize data contained in, the database 80 (shown in FIG. 1). In addition, the database 80 may comprise one or more separate, linked databases.

Also located within the central server 30 is a network interface 74, for interfacing and communicating with other elements of a computer network. In various embodiments, the network interface 74 comprises a WWAN interface, a WLAN Interface and a LAN interface. It will be appreciated by one of ordinary skill in the art that one or more of the central server 30 components may be located geographically remotely from other central server 30 components. Furthermore, one or more of the components may be combined, and additional components performing functions described herein may be included in the central server 30.

In addition, according to various other embodiments, additional central servers linked to a common database (e.g., the database 80) may be incorporated into the data communication system 5 to form a server cluster. In such an embodiment, as will be described in more detail below, the server cluster enables horizontal scalability and permits load balancing of the functions of the central communication manager module 310.

Communication Manager Middleware

As described above, according to various embodiments, the communication manager middleware is comprised of one or more communication manager modules configured to facilitate interoperability among software applications in a data communication system. In the illustrated embodiment of FIG. 1, the data communication system 5 includes communication manager middleware comprised of communication manager modules 110, 214, 310, each of which is a software component of the communication manager middleware loaded on the mobile device 10, the facility device 210, and the central server 30, respectively. According to various embodiments, the communication manager modules 110, 214, 310 are each comprised of various interfaces, sub-modules, and communication channels, which—together—are configured to facilitate communication between components of the data communication system 5 over a variety of communication methods.

Figure 3:
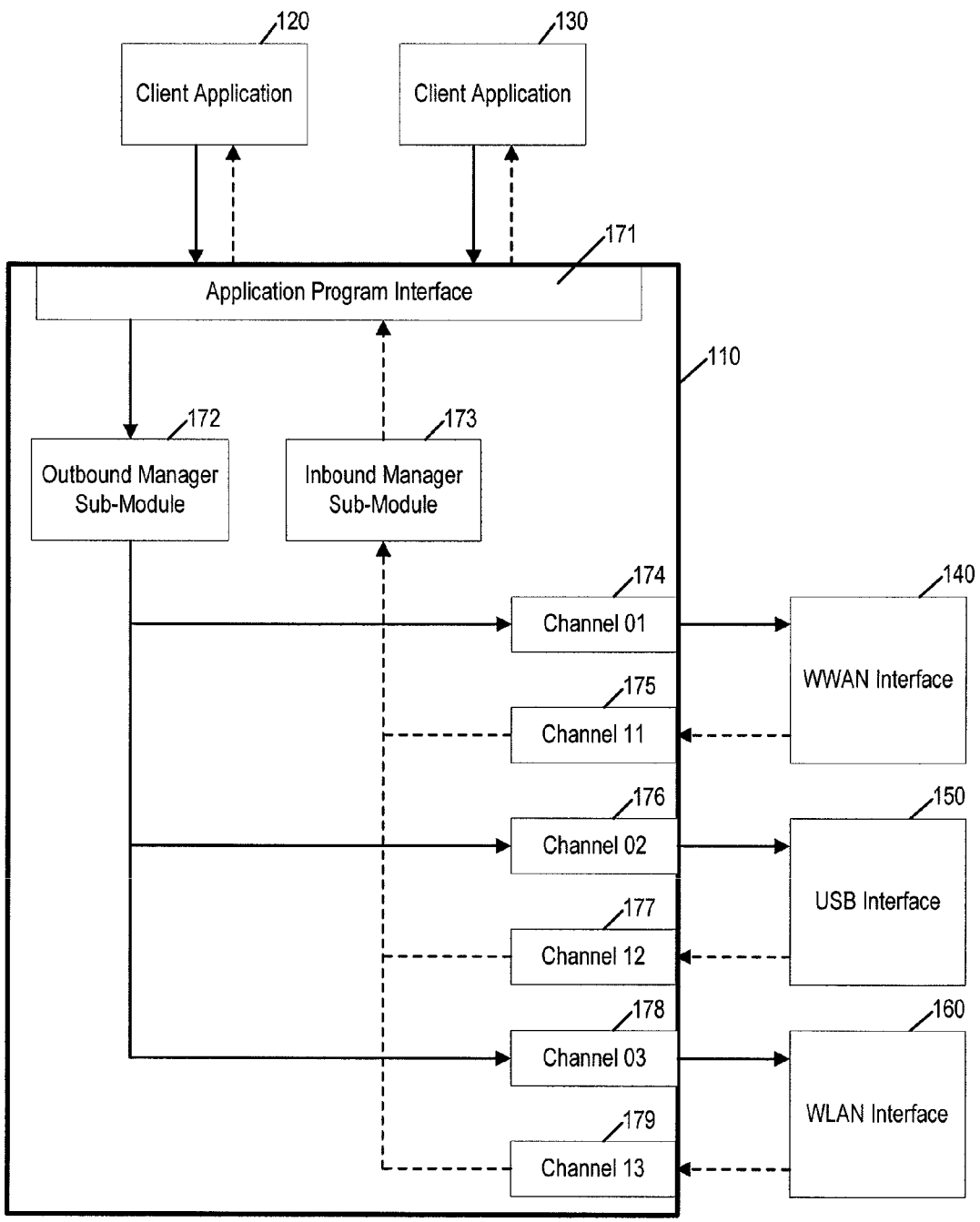
FIG. 3 is a schematic diagram of a remote communication manager module according to one embodiment of the present invention.

For example, FIG. 3 illustrates various components of the remote communication manager module 110 according to one embodiment. In the illustrated embodiment, the remote communication manager module 110 comprises an application program interface ("API") 171, an outbound manager sub-module 172, an inbound manager sub-module 173, and various communication channels 174-179. As shown, the API 171, sub-modules 172, 173, and communication channels 174-179 which permit the exchange of messages outbound from the client applications 120, 130 (represented by solid arrows) and messages inbound to the client applications 120, 130 (represented by dashed arrows). In various embodiments, the central communication manager module 310 and remote communication manager module 214 may be comprised of the same or similar components.

Application Program Interface

As described above, each of the communication manager modules 110, 214, 310 are configured to allow various client applications to communicate through a single application program interface (API), thereby isolating the client applications from the actual data communication method and/or protocol used to exchange a given message. Accordingly, in the illustrated embodiment of FIG. 3, the API 171 is configured to communicate directly with the client applications 120, 130, which reside on the mobile device 10. According to various embodiments, however, the API 171 may be configured to selectively communicate with any number of client applications (e.g., additional client applications loaded on the mobile device 10). As shown in FIG. 3, the API 171 operates as an intermediary between the client applications 120, 130 and the sub-modules 172, 173, communication channels 174-179, and communication interfaces 140, 150, 160. As a result, the sub-modules 172, 173, communication channels 174-179, and communication interfaces 145, 150, 160, may be modified without necessitating modifications to the client applications 120, 130. For example, if a user of the data communication system 5 adds a new communication interface to the mobile device 10 (e.g., an interface compatible with a 4G wireless network), the only component that would need to be updated would be the outbound manager sub-module 172 and the inbound manager sub-module 173. The client applications 120, 130 may not require updating and would remain compatible with the remote communication manager module 110. Likewise, any client application of the remote communication manager module 110 (e.g., a new client application added to the mobile device 10) need only be configured to interoperate with the API 171, rather than a particular data communication protocol, data communication method, or other software applications.

In order to provide abstraction of the various data communication interfaces 140, 150, 160 of the mobile device 10, the remote communication manager module 110 is configured to send messages via outbound communication channels 174, 176, 178 and receive messages via inbound communication channels 175, 177, 179. In various embodiments, the communication channels 174-179 are each associated with a particular communication protocol configured to communicate with at least one of the data communication interfaces 140, 150, 160. As shown in the illustrated embodiment of FIG. 3, outbound Channel 01 174 and inbound Channel 11 175 are configured to communicate with the WWAN interface 140, outbound Channel 02 176 and inbound Channel 12 177 are configured to communicate with the USB interface 150, and outbound Channel 03 178 and inbound Channel 13 179 are configured to communicate with the WLAN interface 160.

As will be appreciated by one of skill in the art, each of the channels 174-179 shown in FIG. 3 may comprise one of a variety of communication protocols that allow the channel to forward messages to its respective communication interface 140, 150, or 160. In addition, as will also be appreciated by one of skill in the art, multiple communication protocols may exist for communicating with a particular communication interface. As such, certain embodiments may include multiple inbound and/or outbound communication channels utilizing different communication protocols for each of the communication interfaces 140, 150, 160. Further, in certain embodiments, various communication channels may be configured specifically for transmitting data between certain client applications of the same communication manager module (i.e., "intranode" communication), or specifically for file transfer exchanges. In addition, the communication channels 174-179 may be easily reconfigured by a user of the data communication system 5 to adapt to different data communication interfaces, thereby enabling the remote communication manager module 110 to interoperate with new or modified data communication interfaces added to, or modified from the mobile device 10.

Physical & Virtual Node IDs

In various embodiments, the communication manager modules 110, 214, 310 are configured to route data inbound to and outbound from their respective client applications. As described above, data outbound from the various client applications is often targeted for a particular vehicle (e.g., data controlling telematics recording on a certain vehicle) or a particular driver (e.g., delivery data to be viewed by a driver in-vehicle). As such, the communication manager modules 110, 214, 310 may be configured to route outbound messages to target communication manager modules based on unique physical and virtual node IDs assigned to the communication manager modules 110, 214, 310.

According to one embodiment, each communication manager module 110, 214, 310 is assigned a unique physical node ID corresponding to the physical device on which it is running (e.g., the mobile device 10). For example, the central communication manager module 310 may be assigned physical node ID "P030," the remote communication manager module 110 may be assigned physical node ID "P010," and the remote communication manager module 214 may be assigned physical node ID "P020." As the physical node IDs are associated with the actual devices on which each communication manager module is running, each unique physical node ID can be used to route an inbound or outbound message to a particular communication manager module 110, 214, 310. For example, if the central communication manager module 310 transmits a message to physical node ID "P010," that message will be routed to the remote communication manager 110 on the mobile device 10.

However, as described above, outbound messages generated by the various client applications are often targeted to particular vehicles or drivers, rather than devices. Accordingly, each of the remote communication manager modules 110, 214 may also be associated with one or more unique virtual node IDs, which are each associated with a particular non-module entity (e.g., a vehicle or driver). For example, in one embodiment, a particular driver may be associated with virtual node ID "V001." Likewise, a particular vehicle may be associated with virtual node ID "V002." Thus, if the mobile device 10 is positioned on the particular vehicle, the mobile communication module 110 may be associated with virtual node ID "V002" in addition to a physical node ID. If the particular driver is driving the particular vehicle on a given day, the mobile communication module 110 may be further associated with virtual node ID "V001."

Accordingly, in various embodiments, the communication manager modules 110, 214, 310 are configured to receive an outbound message targeted for a virtual node ID and, by identifying the physical node ID currently associated with the virtual node ID, route the outbound message to the appropriate communication manager module. Referring back to the example virtual node IDs above, if the central communication manager module 310 received an outbound message targeted to virtual node ID "V001," the module 310 would identify the physical node ID (e.g., P010) associated with "V001" and would route the outbound message to the remote communication manager module 110.

According to certain embodiments, the central communication manager module 310 is configured to manage the registry and maintenance of the physical and virtual node assignments and associations. In one embodiment, the central communication manager module 310 is configured to provide a user interface through which a user may configure various physical and virtual node IDs, as well as rules for associating those node IDs with various communication manager modules.

Outbound Manager Sub-Module

Referring to FIG. 3, the outbound manager sub-module 172 is configured to receive outbound messages from the client applications 120, 130 via the API 171. The outbound manager sub-module 172 is further configured to store received outbound messages and forward those messages to their respective destinations based on a predefined logic used to determine the order in which messages are sent and the communication method used to send each message.

Figure 4:
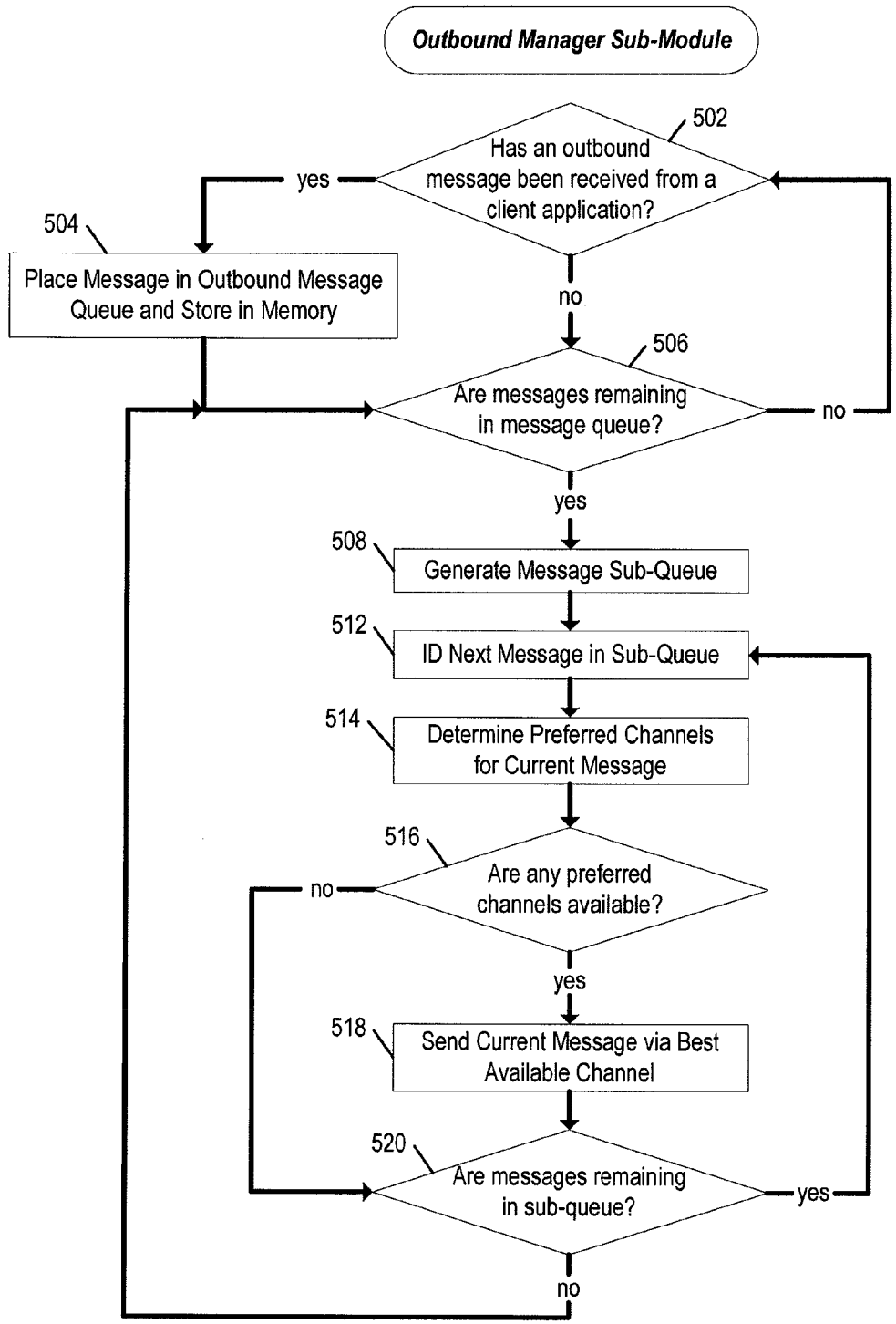
FIG. 4 illustrates steps executed by an outbound manager sub-module according to one embodiment of the present invention.

FIG. 4 illustrates various steps executed by the outbound manager sub-module 172 according to one embodiment. Beginning at step 502, the outbound manager sub-module 172 monitors the API 171 to determine whether an outbound message has been received from a client application. If the outbound manager sub-module 172 does not recognize that an outbound message has been received, the outbound manager sub-module 172 moves to step 506, which is described in detail below. If the outbound manager sub-module 172 recognizes that one or more new outbound messages have been received from a client application, the outbound manager sub-module 172 moves to step 504.

At step 504, the outbound manager sub-module 172 places the received message in an outbound message queue (e.g., in the order in which they were received, using first-in, first-out logic) and stores the received messages in the memory of the mobile device 10. In other embodiments, the one or more received messages may be stored in another computer-readable storage medium (e.g., a hard-drive on the mobile device 10 or a remotely accessible database). In one embodiment, the outbound message queue comprises a list of outbound messages received from client applications that have not yet been transmitted to their target destinations. Generally, the outbound message queue reflects the pool of outbound messages awaiting transmission by the mobile device 10 at any given point, subject to delays in updating the queue.

Next, at step 506, the outbound manager sub-module 172 determines whether any messages remain in the outbound message queue. If there are no messages in the outbound message queue, the outbound manager sub-module 172 returns to step 502 and continues to monitor the API 171 for outbound messages received from client applications. If there are messages in the outbound message queue, the outbound manager sub-module 172 moves to step 508.

At step 508, the outbound manager sub-module 172 generates an outbound message sub-queue. In certain embodiments, the outbound manager sub-module 172 is configured to generate the outbound message sub-queue by retrieving a predefined number of messages that are next in the outbound message queue. For example, in one embodiment, the outbound manager sub-module 172 is configured to retrieve the next 50 messages in the outbound message queue for inclusion in the outbound message sub-queue. Thus, if the outbound message queue contained 200 messages, the resulting outbound message sub-queue would include the first 50 of those 200 messages. Likewise, if the outbound message queue contained 30 messages, the resulting outbound message sub-queue would include all 30 of those messages. As will be appreciated by one of skill in the art, the outbound manager sub-module 172 may be configured to retrieve any defined number of messages in generating the outbound message sub-queue. In addition, according to various other embodiments, the outbound manager sub-module 172 may be configured to generate an outbound message sub-queue comprised of messages selected from the outbound message queue based on any number of message attributes (e.g., priority, type, status).

Next, at step 512, the outbound manager sub-module 172 identifies the next message queued for transmission in the outbound message sub-queue. In one embodiment, the outbound manager sub-module 172 is configured to accomplish this step by identifying the first message in the outbound message sub-queue based on the first-in, first-out ordering of the messages. However, in other embodiments, the outbound manager sub-module 172 may be configured to select the next message based on one or more message parameters (e.g., priority, type, status). As will be appreciated by one of skill in the art, the logic followed by outbound manager sub-module 172 in selecting the next message may be configured to meet the preferences of a user of the data communication system 5. In the description below of steps 514-520, the message selected at step 512 will be referred to generally as the "current outbound message."

Next, at step 514, the outbound manager sub-module 172 determines preferred communication channels for the current outbound message. In certain embodiments, the outbound manager sub-module 172 is configured to determine the preferred communication channels based on the priority of the current outbound message. For example, in one embodiment, the client applications 120, 130 are configured to assign a priority identifier (e.g., associated data) indicating certain priority level (e.g., a numerical value between 1 and 3) to outbound messages transmitted to the API 171. In such an embodiment, a high priority identifier, such as the value "1," may be assigned to messages with low priority (e.g., non-urgent telematics data intended for analysis at a later time), while a low priority identifier, such as the value "3," may be assigned to messages with high priority (e.g., messages instructing a driver to take swift action). As such, the various priority levels may be indicative of a desired time frame (e.g., 24 hours, "as soon as possible") in which a given message is preferably delivered to its target destination.

In certain embodiments, the outbound manager sub-module 172 is configured to identify the priority level assigned to the current outbound message (e.g., 1, 2, or 3) and associate the message with a set of preferred outbound communication channels based on the priority level. For example, in one embodiment, the outbound manager sub-module 172 is configured to associate a low priority level (e.g., priority level "1") with Channel 02 176, which is linked to the USB interface 150, and with Channel 03 178, which is linked to the WLAN interface 160. Thus, if the current outbound message has a priority level of "1", the preferred communication channels for the current outbound message would be Channel 02 176 and Channel 03 178. Such a configuration ensures that messages with low priority may only be transmitted via relatively low-cost data communication methods, such as a WLAN or a USB connection. Similarly, in one embodiment, the outbound manager sub-module 172 is configured to associate a high priority level (e.g., priority level "3") with all of the outbound channels 174, 176, 178. Thus, if the current outbound message has a priority level of "3," all of the outbound channels 174, 176, 178 would be preferred channels for the current outbound message. Such a configuration makes all communication channels available to high priority messages such that high priority messages are transmitted as quickly as possible.

In addition, as described above, the outbound manager sub-module 172 may be configured to arranged the preferred channels hierarchically, such that one of the preferred channels is the most preferred (e.g., the fastest and/or least costly of the preferred channels). For example, in sending a high priority message, the most preferred channel may be Channel 03 178, as transmitting data via the WLAN interface has low cost and fast transmission speed. In the same hierarchy, Channel 01 174 may be the least preferred channel, as transmitting data over a cellular network may have a comparatively high cost and/or slower transmission speed. In various other embodiments, as will be appreciated by one of skill in the art, the logic of the outbound manager sub-module 172 may be modified to select preferred communication channels based on other message attributes (e.g., type, status, size), or to meet other preferences of a user of the data communication system 5.

Next, at step 516, the outbound manager sub-module 172 determines the current availability of the preferred channels identified at step 514. In one embodiment, the outbound manager sub-module 172 is configured to identify a particular channel as being unavailable if it has been deactivated (e.g., as a result of user configuration of the remote communication manager module 110) or if the communication interface with which it is associated is lacking connectivity. For example, in an embodiment where the WLAN interface comprises an 802.11 radio, the outbound manager sub-module 172 may determine that Channel 03 178 is unavailable if the 802.11 radio is unable to locate and connect to a wireless internet signal.

Next, at step 518, the outbound manager sub-module 172 sends the current outbound message to its target destination over the best available channel. In one embodiment, the outbound manager sub-module 172 is configured to identify the best available channel by comparing the preferred channel hierarchy, as determined in step 514, with the current available channels, as determined in step 516. In other words, the best available channel would be the most preferred of the available channels. For example, in the high priority message hierarchy described above, the current outbound message would only be transmitted over Channel 01 174, if both Channel 02 176 and Channel 03 178 are unavailable. According to one embodiment, the outbound manager sub-module 172 is further configured to route the current outbound message to its target destination (e.g., the central communication manager module 310) by the using the physical and virtual node techniques described above.

In addition, as the outbound message is routed through the best available communication channel, an interface application associated with the communication interface 140, 150, or 160 through which the message is routed will prepare the message for transmission. For example, for messages transmitted through the WWAN interface, the WWAN interface application 345 (shown in FIG. 2) is configured to format and/or add data to the outbound message to prepare outbound messages for transmission over the WWAN (e.g., adding cellular routing data). As will be appreciated by one of skill in the art, the mobile devices 10, 210 and central server 30 may include various software, such as the interface applications 345, 365, configured to complete any necessary tasks to prepare outbound messages for transmission over various data communication networks.

After transmitting the current outbound message over the best available channel, the outbound manager sub-module 172 removes the current outbound message from the outbound message sub-queue and moves to step 520. At step 520, the outbound manager sub-module 172 determines whether there are any messages remaining in the outbound message sub-queue. If there are messages remaining in the outbound message sub-queue, the outbound manager sub-module 172 moves to step 512, where it selects the next outbound message for transmission. If there are no messages remaining in the sub-queue, the outbound manager module 172 returns to step 506, from which it will either generate a new message sub-queue (step 508) or resume monitoring for newly received outbound messages (step 502).

As will be appreciated by one of skill in the art, the steps executed by the outbound manager sub-module 172 may be modified in a variety of ways to transmit outbound messages according to the preferences of a user of the data communication system 5. For example, in one embodiment, the outbound manager sub-module 172 is configured to select messages for transmission individually from the outbound message queue (e.g., based on priority or status), rather than using a sub-queue. In addition, as will be appreciated by those of skill in the art, the outbound manager sub-modules of various other communication manager modules (e.g., the central communication manager module 310 and remote communication manager module 214) may be configured to execute the steps shown in FIG. 4, or similar steps achieving similar functionality.

Inbound Manager Sub-Module

In the illustrated embodiment of FIG. 3, the inbound manager sub-module 173 is configured to receive and store inbound messages received via the inbound communication channels 175, 177, 179. The inbound manager sub-module 173 is further configured to store inbound messages, notify target client applications when inbound messages have been received, and forward the inbound messages to their respective target client applications when delivery is requested.

Figure 5:
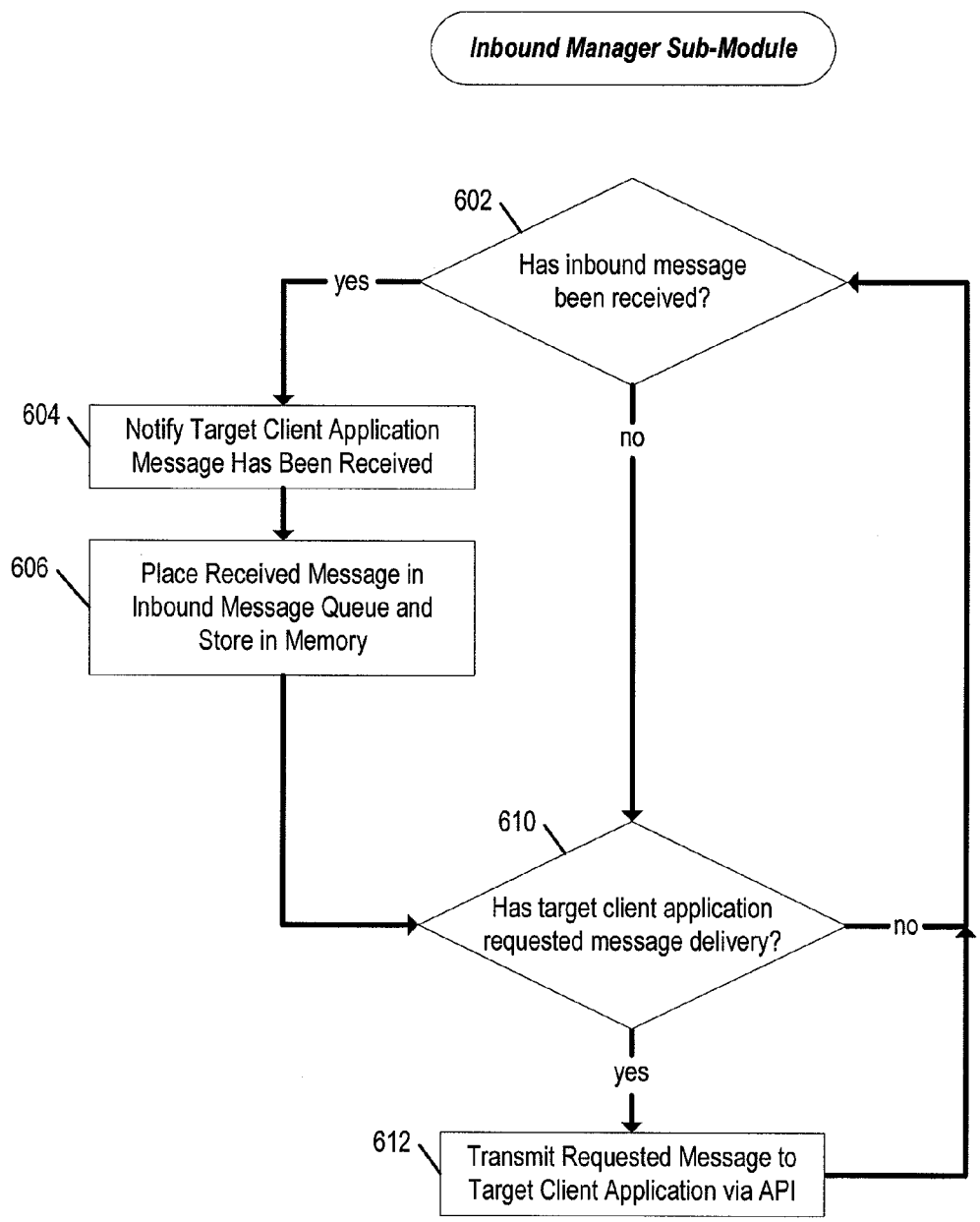
FIG. 5 illustrates steps executed by an inbound manager sub-module according to one embodiment of the present invention.

FIG. 5 illustrates various steps executed by the inbound manager sub-module 173 according to one embodiment. Beginning at step 602, the inbound manager sub-module 173 monitors the inbound communication channels 175, 177, 179 to determine whether an inbound message has been received from another device (e.g., the facility device 210 or the central server 30). In one embodiment, the interface applications 345, 365 are configured to reformat inbound data and/or remove any unnecessary routing data (e.g., cellular routing data) from inbound data received via the mobile device's 10 communication interfaces 140, 150, 160.

If the inbound manager sub-module 173 does not recognize that an inbound message has been received, the inbound manager sub-module 173 moves to step 610, which is described in detail below. If the inbound manager sub-module 173 recognizes that a new inbound message has been received, the inbound manager sub-module 173 moves to step 604. At step 604, the inbound manager sub-module 173 identifies the target client application to which the inbound message is destined, and notifies the target client application that an inbound message has been received (e.g., by sending data indicating a message receipt event).

Next, at step 606, the inbound manager sub-module 173 places the inbound message in an inbound message queue (e.g., in the order in which it was received, using a first-in, first-out logic). In addition, also in step 606, the inbound manager sub-module 173 stores the received inbound message in the memory of the mobile device 10. In other embodiments, inbound messages may be stored in another computer-readable storage medium (e.g., a hard-drive on the mobile device 10 or a remotely accessible database).

Next, at step 610, the inbound manager sub-module 173 determines whether delivery of the inbound message has been requested by the target client application. If delivery has been requested, the inbound manager sub-module 173 transmits the inbound message to its target client application via the API 171. If delivery has not been requested, the inbound manager sub-module 173 loops back to step 602 to continue monitoring for new inbound messages. In one embodiment, the inbound message remains in the inbound message queue until delivery is requested. As shown in FIG. 5, the inbound manager sub-module 173 will always loop back around to step 610 to check whether delivery of any inbound messages in the inbound message queue has been requested. For example, at any point, a client application of the remote communication manager module 110 may request delivery of any undelivered inbound messages and the request will be recognized by the inbound manager sub-module 173 in step 610.

As will be appreciated by one of skill in the art, the steps executed by the inbound manager sub-module 173 may be modified in a variety of ways to transmit inbound messages according to the preferences of a user of the data communication system 5. In addition, as will be appreciated by those of skill in the art, the inbound manager sub-modules of various other communication manager modules (e.g., the central communication manager module 310 and remote communication manager module 214) may be configured to execute the steps shown in FIG. 5, or similar steps achieving similar functionality.

Use of Data Communication System in a Shipping Environment

According to various embodiments, the data communication system 5 may be implemented by a shipping carrier to facilitate communication between various components of a shipping system. For example, in one embodiment, the central server 30 is located within a shipping carrier's central control facility. In such an embodiment, the client applications 320, 330 residing on the central server 30 may be configured to communicate with various shipping carrier workstations running software applications configured to control a variety of the primary functions of the shipping system. For example, in the illustrated embodiment of FIG. 1, the client applications 320, 330 are configured to communicate with the telematics analysis application 95 and driver communication application 90, respectively. As shown in FIG. 1, these applications are configured to communicate with other software applications (e.g., the client applications 120, 130) residing on the mobile devices (e.g., the mobile device 10) of various shipping vehicles.

As described above, the messages transmitted between the various software applications in the data communication system 5 may have varying degrees of priority ranging from high priority (e.g., messages that are preferably delivered to their target destination as soon as possible) to low priority (e.g., messages that are preferably delivered within 24 hours or more). For example, in certain instances the driver communication application 90 may generate a high priority message that needs to be transmitted to a particular driver as soon as possible (e.g., a message indicating a change to the driver's current delivery route). In one embodiment, the driver communication application 90 will transmit the high priority message over a LAN to the client application 330, which will conduct any necessary modifications to the content or format of the high priority message to ensure it is readable by the mobile device 10. The client application 330 will then transmit the high priority message to the central communication manager module 310. The central communication manager module 310 recognizes the message is bound for a particular driver and, using the physical and virtual node methodologies described above, determines that the message is bound for the client application 120 via the remote communication manager module 110. Identifying the message as being high priority, the central communication manager module 310 then identifies an outbound channel associated with the WWAN interface 340 as the preferred communication channel and routes the message to the WWAN interface 340. By transmitting the message over the WWAN 40, the central communication manager module 310 ensures the message is delivered to the client application 120 as soon as possible.

The high priority message is then received by the mobile device 10 via the WWAN interface 140, which transmits the message to the remote communication manager module 110. The remote communication manager module 110 then notifies the target client application 120 that a high priority message has been received. When the client application 120 requests delivery of the message, the remote communication manager module 110 delivers the message to the client application 120. Upon receipt of the high priority message, the client application 120 displays the message to the driver on a display screen of the mobile device 10.

In certain instances, the driver may need to confirm receipt of the high priority message, or otherwise respond to the high priority message. In this case, the driver may reply to the high priority message (e.g., using a keyboard of the mobile device 10). The driver's input is then recognized by the client application 120 and transmitted back to the driver communication application 90 as a new high priority message. In one embodiment, the reply message may follow the reverse path of the original message described above.

In another example, the client application 120 may be configured for collecting a variety of telematics data from various vehicle sensors on a shipping vehicle. In one embodiment, this data may be intended for analysis by the telematics analysis application 95 at a later date. Accordingly, in one embodiment, the client application 120 will generate a low priority message containing the collected telematics data targeted for the the telematics analysis application 95, via the central communication manager module 310 and the client application 320. The client application 120 then transmits the low priority message to the remote communication manager module 110. The remote communication manager module 110 recognizes the message as low priority and identifies outbound channels associated with the USB interface 150 and WLAN interface 160 (e.g., Channel 02 176 and Channel 03 178 shown in FIG. 3), with the WLAN-associated outbound channel being the most preferred. By selecting outbound channels configured for communication through interfaces connected to the WLAN 50 and USB link 70, the remote communication manager module 110 ensures the low priority message is not unnecessarily transmitted over the more costly WWAN 40.

Next, the remote communication manager module 110 places the low priority message in its outbound message queue until it recognizes connectivity to the WAN 60 via the WLAN 50, which is broadcast from a wireless antenna at the shipping carrier facility 20, or connectivity to the USB link 70, which would be provided via a link to the USB interface 212 of the facility device 210. Accordingly, when the shipping vehicle on which the mobile device 10 is located moves within or near the shipping carrier facility 20, the remote communication module 110 will detect connectivity to the WLAN 50. If the WAN 60 is operating effectively, the remote communication manager module 110 will route the low priority message to the WLAN interface 160. The WLAN interface 160 will then transmit the low priority message over the WLAN 50 to the LAN of the shipping carrier facility 20 and over the WAN 60 to the central server 30.

However, in certain instances, the remote communication manager module 110 may recognize that the WAN 60 is inoperable. In this instance, the driver may elect to establish the USB link 70 connecting the USB interface 150 of the mobile device 10 to the USB interface of the facility device 210. When this occurs, the remote communication manager module 110 will recognize connectivity through the USB interface 150 and transmit the low priority message over the USB link 60 to the USB interface 212. The USB interface 212 will then transmit the low priority message to the remote communication manager module 214. The remote communication manager module 214 will then place the low priority message in its outbound message queue until the WAN 60 is operable, at which point the remote communication manager module 214 will transmit the low priority message over the LAN over of the shipping carrier facility 20 and the WAN 60 to the central server 30.

The low priority message is then received by the central server 30 via the WAN interface 360, which transmits the message to the central communication manager module 310. The central communication manager module 310 then notifies the target client application 320 that a low priority message has been received. When the client application 320 requests delivery of the low priority message, the central communication manager module 310 delivers the low priority message to the client application 320. Upon receipt of the low priority message, the client application 320 transmits the message over a LAN to the telematics analysis application 95.

CONCLUSION

Many modifications and other embodiments of the present invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for sending and receiving data in a system environment, said device comprising:
two or more data communication interfaces configured for transmitting and receiving data via two or more data communication methods;
one or more hardware processors configured to:
transmit data outbound from said device via said data communication interfaces;
receive data inbound to said device via said data communication interfaces;
execute two or more client applications, wherein each of said client applications are configured to send outbound application data to a middleware communication manager module via an application program interface, said outbound application data comprising a plurality of messages each associated with a priority value indicating a level of priority for transmitting its associated message, and wherein each of said client applications are configured to receive inbound application data from said middleware communication manager module via said application program interface; and
execute said middleware communication manager module, said middleware communication manager module configured to:
receive said outbound application data from said client applications via said application program interface and receive said inbound application data from said data communication interfaces;
for each message in said outbound application data:
select at least two preferred data communication methods for transmitting a respective message, wherein said preferred data communication methods are selected from said data communication methods based at least in part on said level of priority associated with the respective message;
arrange said preferred data communication methods hierarchically according to relative preference for the respective message;
identify those of said preferred data communication methods currently available for transmitting the respective message; and
route the respective message to the most-preferred of said available preferred data communication methods according to said hierarchical arrangement of said preferred data communication methods; and
for each message in said inbound application data, transmit said inbound application data via said application program interface to said client applications.

2. The device of claim 1, wherein middleware communication manager module is further configured to:
receive a first set of inbound data from one of said data communication interfaces; and
transmit said first set of inbound data via said application program interface to said client application.

3. The device of claim 1, wherein said hierarchal arrangement of said preferred data communication methods is determined based, at least in part, on the relative cost of said preferred data communication methods.

4. The device of claim 1, wherein said hierarchal arrangement of said preferred data communication methods is determined based, at least in part, on the relative delivery speed of said data communication methods.

5. A system for exchanging data among devices in a shipping carrier network, wherein the system comprises:
a mobile device comprising:
a plurality of data communication interfaces configured for transmitting and receiving data via two or more data communication methods; and
one or more hardware processors configured for:
executing a first client application configured to send a first set of outbound application data to a remote middleware communication manager module via a first application program interface, and receive a first set of inbound application data from said remote middleware communication manager module via said first application program interface; said first set of outbound application data comprising a first plurality of messages each associated with a priority value indicting a level of priority for transmitting its associated message;
executing said remote middleware communication manager module configured to manage outbound messages sent from said first client application and inbound messages bound for said first client application, wherein said remote middleware communication manager module is configured to:
determine the priority of each message in said first set of outbound application data based at least in part on the priority value associated with each message in said first plurality of messages;
select at least two preferred data communication methods for transmitting each message in said first plurality of messages, wherein said preferred data communication methods are selected from a plurality of data communication methods based at least in part on said priority of each message in said first set of outbound application data;
arrange said preferred data communication methods hierarchically according to relative preference for each message in said first plurality of messages;

identify those of said preferred data communication methods currently available for transmitting each message in said first plurality of messages; and route each message in said first plurality of messages to the most-preferred of said available preferred data communication methods according to said hierarchical arrangement of said preferred data communication methods; and a central server comprising:

a plurality of data communication interfaces configured for transmitting and receiving data to said mobile device via two or more data communication methods; and one or more hardware processors configured for:

executing a second client application configured to send a second set of outbound application data to a central middleware communication manager module via a second application program interface, and receive a second set of inbound application data from said central middleware communication manager module via said second application program interface; said second set of outbound application data comprising a second plurality of messages each associated with a priority value indicting a level of priority for transmitting its associated message;

executing said central middleware communication manager module configured to manage outbound messages sent from said second client application and inbound messages bound for said second client application, wherein said central middleware communication manager module is configured to:

determine the priority of each message in said second set of outbound application data based at least in part on the priority value associated with each message in said second plurality of messages;

select at least two preferred data communication methods for transmitting each message in said second plurality of messages, wherein said preferred data communication methods are selected from said data communication methods based at least in part on said priority of each message in said second set of outbound application data;

arrange said preferred data communication methods hierarchically according to relative preference for each message in said second plurality of messages;

identify those of said preferred data communication methods currently available for transmitting each message in said second plurality of messages; and route each message in said second plurality of messages to the most-preferred of said available preferred data communication methods according to said hierarchical arrangement of said preferred data communication methods.

6. The system of claim 5, wherein:
said mobile device is positioned on a vehicle;
said first client application is configured for collecting telematics data from said vehicle; and
said first set of outbound application data comprises at least a portion of said telematics data collected by said first client application.

7. The system of claim 5, wherein:
said mobile device is positioned on a vehicle and further comprises a display screen;
said second client application is configured at least for generating messages to a driver of said vehicle;
said first client application is configured at least for displaying messages to a driver of said vehicle via said display screen; and
said second set of outbound application data comprises a message intended for said driver.

8. The system of claim 5, wherein:
said central middleware communication manager is associated with a physical node identifier;
said remote middleware communication manager is further configured to send each message in said first plurality of messages to said central middleware communication manager based, at least in part, on said physical node identifier.

9. The system of claim 5, wherein:
said remote middleware communication manager is associated with a physical node identifier and a virtual node identifier;
said remote middleware communication manager is further configured to send each message in said first plurality of messages to said central middleware communication manager based, at least in part, on said physical node identifier.

10. The system of claim 5, wherein:
said attributes associated with said first outbound message include a first priority identifier associated with said first outbound message;
said attributes associated with said second outbound message include a second priority identifier associated with said second outbound message.

11. The system of claim 5, wherein:
wherein said priority values associated with each message in said first and second plurality of messages comprise numerical data;
wherein said first client application is configured to associate said priority values associated with each message in said first plurality of messages with each message in said first plurality of messages; and
wherein said second client application is configured to associate said priority values associated with each message in said second plurality of messages with each message in said second plurality of messages.

12. A computer program product for sending and receiving data in a system environment, the computer program product comprising at least one non-transitory computer-readable storage medium having computer-readable program code portions stored therein, the computer-readable program code portions comprising:

an executable portion configured to receive outbound application data from a client application via an application program interface and receive inbound application data from a data communication interface, wherein said outbound application data comprises a plurality of messages each associated with a priority value indicating a level of priority for transmitting its associated message;

an executable portion configured to select at least two preferred data communication methods for transmitting a message in said plurality of messages, wherein said preferred data communication methods are selected from a plurality of data communication methods based, at least in part, on said priority value associated with each message from said plurality of messages;

an executable portion configured to arrange said preferred data communication methods hierarchically according to relative preference for each message in said plurality of messages;

an executable portion configured to identify those of said preferred data communication methods currently available for transmitting each message in said plurality of messages; and an executable portion configured to route each message in said plurality of messages to the most-preferred of said available data communication methods according to said hierarchical arrangement of said preferred data communication methods.

13. A computer-implemented method for sending and receiving data in a system environment, said method comprising the steps of:

(A) receiving outbound application data from a client application via an application program interface and inbound application data from a data communication interface, wherein said outbound application data comprises a plurality of messages each associated with a priority value indicating a level of priority for transmitting its associated message;

(B) selecting at least two preferred data communication methods for transmitting a message in the plurality of messages, wherein said preferred data communication methods are selected from a plurality of data communication methods based, at least in part, on said priority value associated with each message in said plurality of messages;

(C) arranging said preferred data communication methods hierarchically according to relative preference for each message in said plurality of messages;

(D) identifying those of said preferred data communication methods currently available for transmitting each message in said plurality of messages; and (E) routing the respective message to the most-preferred of said available data communication methods according to said hierarchical arrangement of said preferred data communication methods.

* * * * *